US007277201B2

(12) United States Patent
Hains

(10) Patent No.: US 7,277,201 B2
(45) Date of Patent: Oct. 2, 2007

(54) SYSTEMS AND METHODS FOR DESIGNING DIGITAL ANAMORPHIC LINE SCREENS

(75) Inventor: Charles M. Hains, Altadena, CA (US)

(73) Assignee: Xerox Corporation, Stamford, CT (US)

( * ) Notice: Subject to any disclaimer, the term of this patent is extended or adjusted under 35 U.S.C. 154(b) by 966 days.

(21) Appl. No.: 10/445,851

(22) Filed: May 28, 2003

(65) Prior Publication Data

US 2004/0239962 A1 Dec. 2, 2004

(51) Int. Cl.
 G06F 15/00 (2006.01)
 H04N 1/60 (2006.01)
(52) U.S. Cl. ............... 358/1.9; 358/465; 358/3.06; 358/3.2; 358/533; 358/3.26; 358/536
(58) Field of Classification Search .............. 358/1.9, 358/465, 3.06, 3.2, 533, 3.26, 536
 See application file for complete search history.

(56) References Cited

U.S. PATENT DOCUMENTS

| 4,918,622 | A |   | 4/1990 | Granger et al. |
|---|---|---|---|---|
| 5,274,472 | A |   | 12/1993 | Williams |
| 5,325,216 | A |   | 6/1994 | AuYeung |
| 5,442,461 | A | * | 8/1995 | Levien ............ 358/3.19 |
| 5,485,289 | A |   | 1/1996 | Curry |
| 5,606,648 | A |   | 2/1997 | Walther et al. |
| 5,655,061 | A |   | 8/1997 | Tse et al. |
| 5,742,703 | A |   | 4/1998 | Lin et al. |
| 5,920,683 | A |   | 7/1999 | Girmay |
| 6,208,430 | B1 |   | 3/2001 | Hains et al. |
| 6,262,811 | B1 |   | 7/2001 | Hains et al. |

(Continued)

FOREIGN PATENT DOCUMENTS

EP 1 067 763 A 1/2001

OTHER PUBLICATIONS

Wang et al., Shen-Ge "Non-Orthogonal Screen and Its Application In Moire-Free Halftoning," Color Imaging VIII: Processing, Hardcopy, and Applications Jan. 21-24, 2003, Santa Clara, CA, USA, *Proc. of SPIE*, vol. 5008, Jan. 21, 2003 pp. 399-408.

(Continued)

*Primary Examiner*—King Y. Poon
*Assistant Examiner*—Quang N. Vo
(74) *Attorney, Agent, or Firm*—Oliff & Berridge, PLC

(57) ABSTRACT

Historically, the creation of digital line screens was considered to be a subset of the creation of the digital cluster dot screens. The geometric constraints necessary for digital cluster dot screens were imported into the creation of digital line screens. Accordingly, the number of available angles or digital line screens was also significantly limited. In various exemplary embodiments of the systems and methods according to this invention, a digital line screen cell is defined such that the vectors defining the digital line screen cell are not necessarily isometric and are not necessarily at right angles to each other. By using a high-addressability grid that has different resolutions along x and y axis of the grid, the systems and methods according to this invention allow the components of the vectors along the high-addressability direction to be noninteger multiples of the components of the vectors along the other direction of the grid.

26 Claims, 6 Drawing Sheets

U.S. PATENT DOCUMENTS 6,325,487 B1 12/2001 Mantell
6,442,300 B1 8/2002 Hains
6,449,396 B1 9/2002 Loce et al.

OTHER PUBLICATIONS

Sharma, Gaurav "Nonorthogonal halftone screens," Digital Color Imaging Handbook, Dec. 23, 2002, CRC Press, USA, pp. 446-457.

Baqai et al. "Computer-Aided Design of Clustered-Dot Color Screens Based on a Human Visual System Model," *Proceedings of the IEEE*, vol. 90, No. 1, Jan. 2002, pp. 104-122.

Hains, C.M. "The 30-year evolution of digital halftoning from the viewpoint of a participant," Color Imaging IX: Processing, Hardcopy, and Applications, Jan. 20-22, 2004, San Jose, CA, USA, *Proc. of SPIE*, vol. 5293, No. 1, Dec. 18, 2003, pp. 434-447.

Thomas M. Holladay; "An Optimum Algorithm for Halftone Generation for Displays and Hard Copies"; SID; vol. 21 No. 2; 1980; pp. 185-192.

\* cited by examiner

SYSTEMS AND METHODS FOR DESIGNING DIGITAL ANAMORPHIC LINE SCREENS

BACKGROUND OF THE INVENTION

1. Field of Invention

This invention is directed to determining the design parameters for lines screens.

2. Description of Related Art

Most marking technologies, such as offset printing, laser printing, and inkjet printing, use halftone printing techniques to form a pictorial region on an image receiving substrate based on continuous tone input image data. That is, such conventional image forming techniques represent continuous tone or gray scale image data using halftone techniques that integrate between portions of the image that are completely printed at a full density and portions of the image that are left unprinted, such that the background color is visible. When this is done at a high enough spatial frequency, the human visual system perceives this combination of full color and background color to be a gray scale value between the background color and the full color.

In "An Optimum Algorithm for Halftone Generation for Displays and Hard Copies", by T. Holladay, Proceedings of the SID, Vol. 12, no. 2, 1980, which is incorporated herein by reference in its entirety, Holladay discloses a method for creating a halftone cell that forms a screen pattern at some desired angle to the process/scanning directions. The screen pattern is formed by repeatedly tiling the halftone cell over the plane of the image receiving substrate. The resulting screen pattern includes rows of dots, each dot made from a number of pixels. Holladay's technique allows for the halftone screen to be created at various desired angles. Conventionally, digital cluster dot screens use isometric dots, i.e., dots having the same length side vectors $\bar{a}$ and $\bar{b}$. Moreover, conventionally, digital cluster dot screens are normally square, such that the vectors $\bar{a}$ and $\bar{b}$ are at right angles to each other. Because of the geometric constraints, the angles and frequencies that can be achieved using Holladay's technique are significantly limited.

SUMMARY OF THE INVENTION

Historically, the creation of digital line screens, such as those shown in FIGS. 1 and 2, were considered to be a subset of the creation of digital cluster dot screens. Thus, as shown in FIGS. 1 and 2, the geometric constraints necessary for digital cluster dot screens were imported into the creation of digital line screens. Accordingly, the number of available angles and frequencies for digital line screens was also significantly limited.

This invention provides systems and methods for designing digital line screens that eliminate the geometric requirements of digital cluster dot screens.

This invention separately provides systems and methods for designing digital line screens that use the high-addressability spacing to determine the frequency and angle of the line screens.

This invention separately provides systems and methods for designing anamorphic digital line screens that use different resolution in the x and y directions.

This invention separately provides systems and methods for designing digital line screens that use vectors having lengths along a high-addressability direction of a high-addressability grid that are not multiples of the addressability factor.

In various exemplary embodiments of the systems and methods according to this invention, a digital line screen cell is define such that the vectors defining the digital line screen cell are not necessarily isometric and are not necessarily at right angles to each other. In various exemplary embodiments that use a high-addressability grid that has different resolutions along the x and y axis of the grid, the systems and methods according to this invention allow the components of the vectors along the high-addressability direction to be noninteger multiples of the components of the vectors along the other direction of the grid.

These and other features and advantages of this invention are described in, or are apparent from, the following detail description of various exemplary embodiments of the systems and methods according to this invention.

BRIEF DESCRIPTION OF THE DRAWINGS

Various exemplary embodiments of systems and methods according to this invention will be described in detail, with reference to the following Figures, wherein.

DETAILED DESCRIPTION OF EXEMPLARY EMBODIMENTS

The systems and methods according to this invention provide techniques for designing digital line screens that allow more accurate screen angles to be selected and allow much more flexibility in the line frequency that is produced. In various exemplary embodiments, this increased accuracy in the screen angles is obtained by using the anamorphic resolution provided by high-addressability image forming devices. Similarly, in various exemplary embodiments, the increase in flexibility is achieved by allowing the Holladay brick width and the Holladay shift parameters to take any value enabled by the high-addressability anamorphic resolution, rather than restricting these values to be multiples of the high-addressability factor.

High-addressability image forming systems have a first resolution, usually in the slow scan direction, that is lower than a high-addressability resolution, which is usually in the fast scan direction. In general, the ratio between the special resolution along the high-addressability direction relative to the standard resolution direction is the high-addressability factor a. U.S. Pat. No. 5,274,472 to Williams, which is incorporated herein by reference in its entirety, discloses methods for converting gray level image data from image input terminals into binary data for high addressability image output terminals. U.S. Pat. No. 5,485,289 to Curry, which is incorportated herein by reference in its entirety, discloses printing systems for rendering bitmapped image data on a photosensitive recording medium. Curry's system includes a data source for supplying grayscale input image data and a scanning device for rendering grayscale output image data onto the recording medium.

Figure 1:
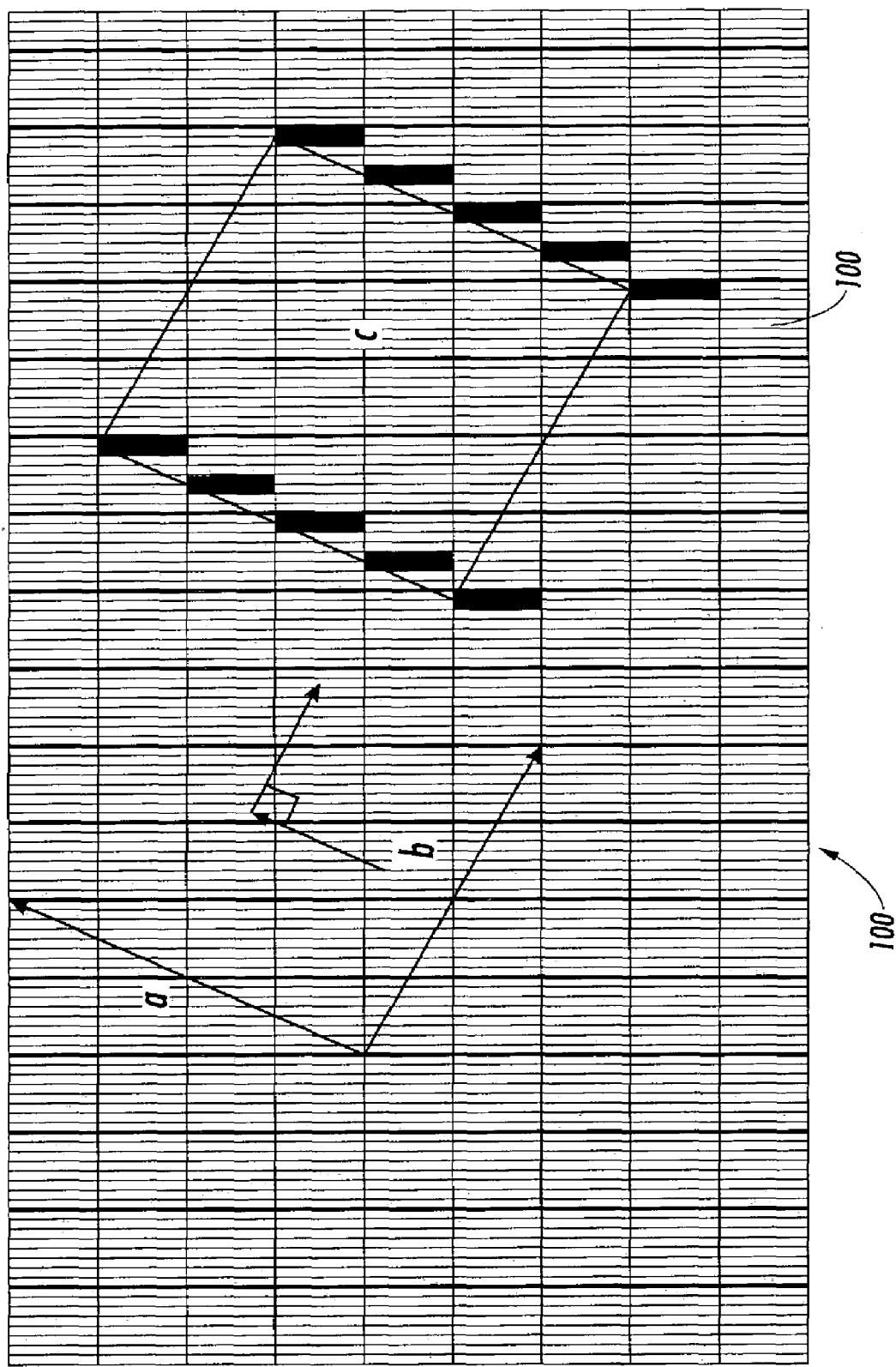
FIG. 1 shows an isometric, square digital line screen aligned to the low-addressability cells of a high-addressability grid.
Figure 2:
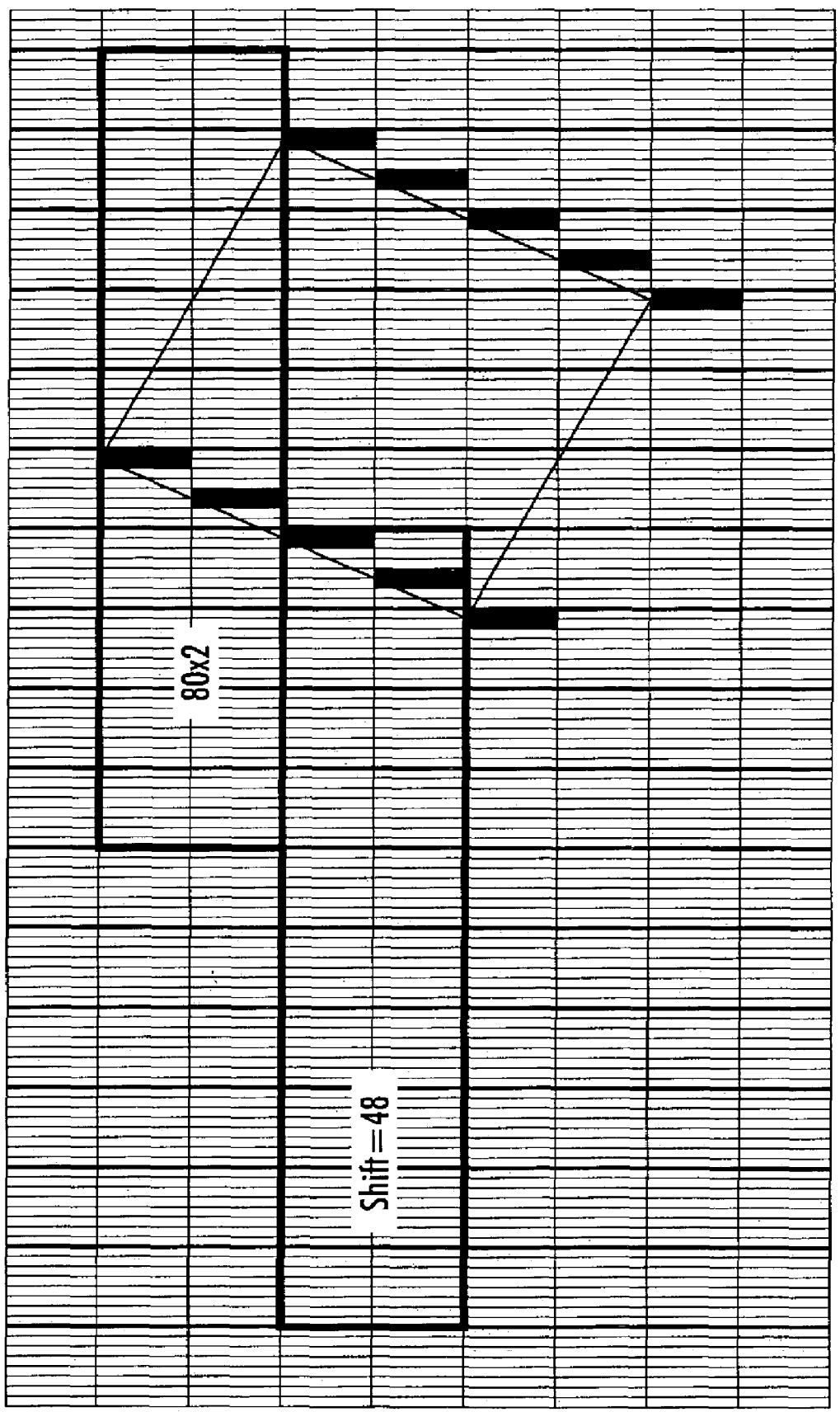
FIG. 2 shows the Holladay brick usable to implement the halftone digital line screen shown in FIG. 1.

As shown in FIGS. 1 and 2, conventionally, when designing a digital halftone cell, whether for a dot screen or a line screen, a vector is defined on the basic resolution grid at the desired screen angle to the basic resolution grid. The length of the vector is defined as the inverse of the desired frequency of the halftone dot or line screen. Since the vector is defined on the basic grid, this vector is represented as a pair of components along the x, or fast scan direction and the y, or slow scan direction, where the x and y components are both integers relative to the basic resolution grid. In FIG. 1, this first vector is labeled $\bar{a}$. After the first vector $\bar{a}$, having components (x, y), is defined, the square symmetry assumption requires that the second vector, shown in FIG. 1 as $\bar{b}$, have components value (x', y',) along the fast and the slow scan directions. In particular, the square symmetry assumption means that the vector components x' and y' are equal to y and −x, respectively. That is, the x component of the second vector $\bar{b}$ is the same value as the y component of the first vector $\bar{a}$, while the y' component of the second vector $\bar{b}$ is the inverse of the x component of the first vector $\bar{a}$. As shown in FIG. 1, these two vectors $\bar{a}$ and $\bar{b}$ together define a basic halftone cell C, which is repeated or tiled over the plane of a high-addressability grid 100.

To use the basic halftone cell C as a basic halftone line screen cell, each level of the halftone line screen is formed by marking an additional one of a number of high-addressability cells 110 adjacent to either side of the first four cells that establish a line within the basic cell C. For example, in FIG. 1, the basic cell C is shown as a line screen having a halftone value of 8.

High-addressability raster or scanning is defined as a system where the pixel resolution in one direction is an integer multiple of the pixel resolution in the other direction. This can be accomplished by increasing the clock speed along a scan line by an integer multiple in an otherwise normal system. FIGS. 1-4 illustrate an 8:1 high-addressability system having a high-addressability factor in the x direction of 8. Because of this, each logical pixel 110 in the high-addressability grid 100 appears as a tall skinny rectangle.

As indicated above, there is a fixed integer relationship, i.e., the high-addressability factor a, between the steps in the x direction and the steps in the y direction. Because, due to the isometric assumption illustrated in the basic halftone line screen cell shown in FIGS. 1 and 2, it follows that the value of x for a square dot on a high-addressability grid can only assume multiples of the addressability factor a. For example, for the exemplary embodiment shown in FIGS. 1 and 2, x can assume only values of 0, 8, 16, 24 . . . in units of the high-addressability spacing. In the specific exemplary embodiment shown in FIGS. 1 and 2, the components value x, y, x' and y' for the vector $\bar{a}$ and $\bar{b}$ are (2, 4) and (4, −2) along the basic resolution grid. Multiplying the x component by the high-addressability factor a=8 obtains the high-addressability values for these components, i.e., (16, 4) and (32, −2).

As a result of the geometric constraints, as shown in FIG. 2, when the desired halftone cell C shown in FIG. 1 is implemented as a tiling of Holladay bricks, the Holladay brick will have a width that is a multiple of the addressability factor a. Likewise, the horizontal steps or shift between bricks will also be a multiple of the addressability factor a. In particular, the implementation of the Holladay brick shown in FIG. 2 is a Holladay brick that is two scan lines high by 80 high-addressability units wide, where there is a shift of 48 high-addressability units between vertically-adjacent Holladay bricks. In particular, it should be appreciated that both the length of the Holladay brick shown in FIG. 2, that is, 80 high-addressability units, and the shift between vertically-adjacent Holladay bricks, that is, 48 high-addressability units, are both multiples of the addressability factor a, which is 8 in the exemplary embodiment shown in FIG. 2. It should also be appreciated that the vertical edges of the Holladay brick shown in FIG. 2 are aligned with the left edges of the unit cells that are divided into 8 high-addressability units.

Because of this implicit restriction for square halftone line screen cells, it has been convenient to think of the high-addressability grid as being basically square, but with an addressability factor. That is, it has been common or convenient to refer to the grid shown in FIGS. 1 and 2 as, for example, a 600 spi by 600 spi raster with an 8 to 1 addressability. However, in terms of addressability, the grids shown in FIGS. 1 and 2 are actually a 4800 spi by 600 spi raster. One reason it is convenient or common to refer to the grids shown in FIGS. 1 and 2 as square rasters with high addressability is because all of the parameters for a square halftone cell can be expressed in terms of the lower resolution. This occurs because the vertices of the square halftone cells must fall on the grid boundaries defined at the lower resolution. It is also more convenient or common to think of the grids shown in FIGS. 1 and 2 at this lower resolution because the optical resolution of the image forming system is closely related to the lower resolution due to the size of the scanned laser beam spot. That is, the scanned laser beam spot is relatively round, such that the minimum size spot on the photoreceptor corresponds to the lower resolution. In contrast, the size of any exposed areas that is larger than the minimum spot size can be precisely controlled based on the high-addressability resolution. It should be appreciated that, in various exemplary embodiments, exposed areas that are somewhat smaller than the minimum spot size can also be controlled to a certain degree. However, it is difficult to control this smaller area precisely and the smallest area may not be controllable at all.

Additionally, many hardware implementations use this restriction in order to gain parallelism or speed in operation. That is, these implementations require Holladay widths or steps to be multiples of the addressability factor.

However, when creating halftone line screens, as opposed to the halftone dot screens discussed above, the situation is different. For halftone line screens, the only relevant parameter in one direction is the screen angle, while the only relevant parameter in the orthogonal direction is the line frequency of the halftone line screen. That is, there is no requirement for the effective halftone line screen itself to be square, or even isometric. Accordingly, for halftone line screens, such halftone line screens are able to use the full addressability of the high-addressability grid to gain more precision in the angle in the primary screen vector. That is, halftone line screens can be anamorphic. Moreover, for such halftone line screens, it is not necessary for the second vector to be perpendicular or orthogonal to the primary screen vector. Accordingly, the full addressability can be used to increase the precision of the effective halftone line screen frequency.

Figure 3:
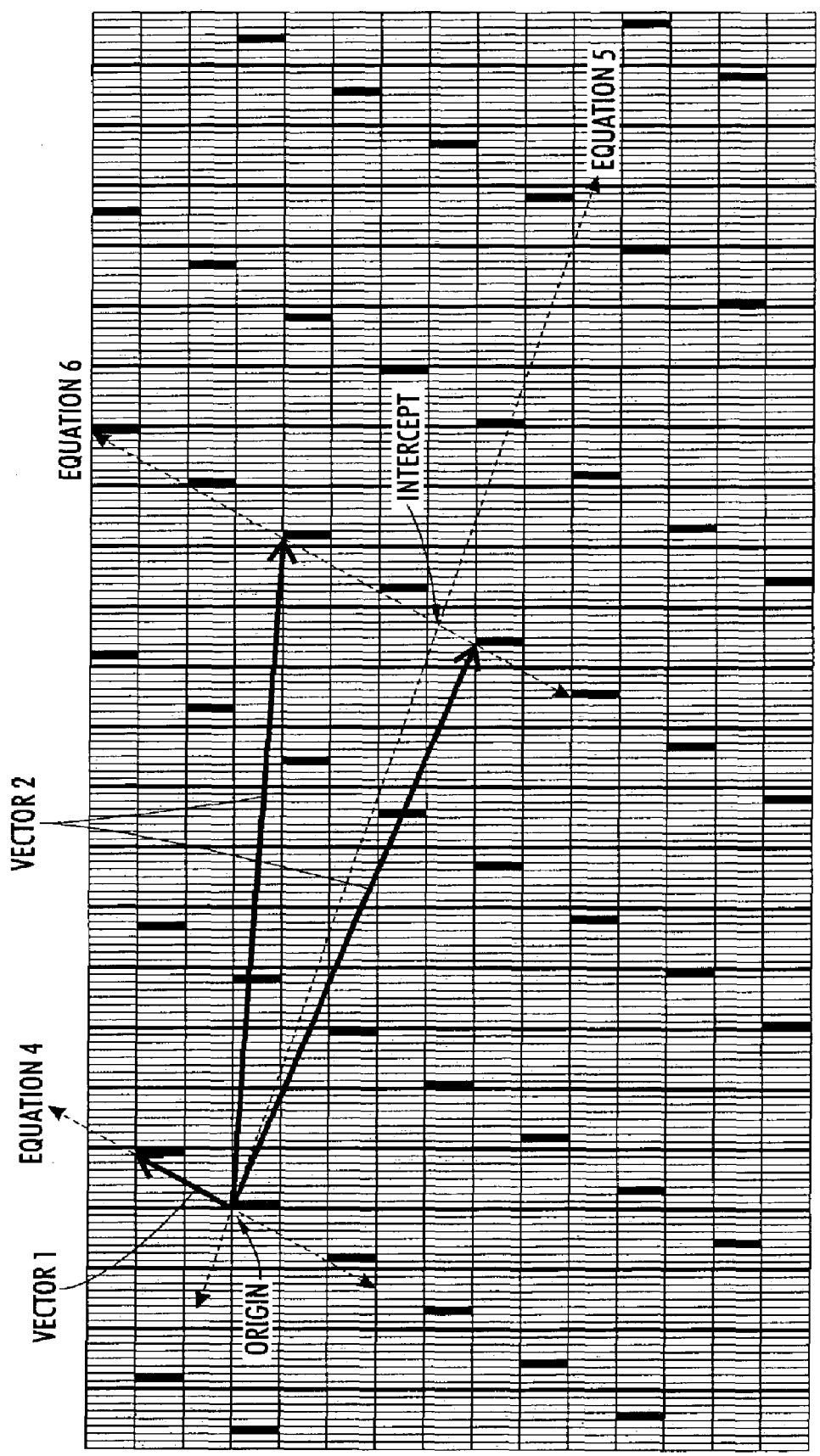
FIG. 3 shows an anamorphic digital line screen according to this invention aligned to the high-addressability grid.

In general, as shown in FIG. 3, a first vector $V_1$ is defined such that the first vector $V_1$ is parallel to the desired halftone line screen. That is, the first vector $V_1$ is defined to obtain a desired angle θ for the halftone line screen relative to a reference direction. This reference direction is often the high-addressability axis of the grid, which is usually defined as the x axis. In this case, the low-resolution, scan line direction, which is orthogonal to the high-addressability direction, is defined as the y axis. The first vector $V_1$ is defined as u high-addressability pixels and v scan lines. That is:

$$V_1 = (u_1, v_1). \quad (1)$$

Alternatively, the first vector $V_1$ can be defined using the low resolution grid units x and y. That is, $V_1=(x_1, y_1)$, where x and y are:

$$x = u/a, \text{ and}$$

$$y = v. \quad (2)$$

Accordingly, the halftone line screen angle $\theta$ is $\tan^{-1}(y/x)$. In particular, if the x axis is the reference axis, a slope m of the first vector $V_1$ relative to the reference axis is:

$$m = (y/x) = (av/u). \quad (3)$$

As indicated above, the first vector $V_1=(x_1, y_1)=(u_1, v_1)$ is by definition parallel to the desired halftone line screen. Accordingly, the equation of a line 1 that is parallel to the visual line screen that passes through the origin is:

$$y = mx. \quad (4)$$

Similarly, the equation of a line 2 that is perpendicular to the line screen and that also passes through the origin is:

$$y = -x/m. \quad (5)$$

As indicated above, a second vector $V_2=(x_2, y_2)=(u_2, v_2)$, which is not necessarily perpendicular or normal to the first vector $V_1$, defines the desired frequency F of the halftone line screen. Additionally, as indicated above, in such halftone line screens, the desired frequency F of the halftone line screen can be, and usually is, defined independently of the angle $\theta$ of the halftone line screen. In general, the desired frequency F of the halftone line screen is defined as the number of halftone screen lines that occur in the halftone line screen per inch. In contrast, the base resolution R of the underlying raster grid on which the halftone line screen is formed is defined as the number of raster scan lines per inch. That is, the base resolution R defines the y-axis resolution. Then, because the base-resolution R along the x axis, i.e., the x-axis resolution, is defined based on square base resolution cells, the low-resolution dimension x along the fast-scan direction is equal to the raster scan line resolution along the y or slow-scan direction. The high-addressability resolution or size of the high-addressability units u is thus equal to the low-resolution x divided by the high-addressability factor a.

Accordingly, when the beginning point of the second vector $V_1=(x_2, y_2)$ is also placed at the origin, as shown in FIG. 3, the end point of the vector $V_2$ defines a point on a line 3 that is parallel to the halftone line screen at a next phase of the halftone line screen. The equation of this line 3 is thus:

$$y - y_2 = m(x - x_2), \text{ or}$$

$$y = mx - mx_2 + y_2. \quad (6)$$

Then, the intercept I, as shown in FIG. 3, is:

$$x = m(mx_2 - y_2)/(1 + m^2), \text{ and}$$

$$y = -(mx_2 - y_2)/(1 + m^2). \quad (7)$$

The perpendicular distance between the halftone line structures of the halftone line screen defined by Eqs. (4) and (6) is the inverse of the desired frequency of the lines of the halftone line screen. At the same time, because Eqs. (4) and (5) pass through the origin, and Eqs. (6) is parallel to Eq. (4) but is aligned with the next phase of the halftone line screen, the perpendicular distance d between the halftone line structures of the halftone line screen is equal to the distance d from the origin to the intercept I. Moreover, because the vector components x and y are perpendicular to each other, the distance d can be determined by the Pythagorean theorem. That is:

$$d = (x^2 + y^2)^{0.5}. \quad (8)$$

Accordingly, by substituting the formulas for x and y defined in Eq. (7) into Eq. (8), and reducing, the perpendicular distance d is:

$$d = (mx_2 - y_2)/(m^2 + 1)^{0.5}. \quad (9)$$

At the same time, it should be appreciated that a halftone cell may contain n cycles or phases of the halftone line screen. As a result, the desired frequency F can be defined as:

$$F = nR/d. \quad (10)$$

In general, there are many values for the second vector $V_2$ that will produce equivalent Holladay blocks. In general, there are h values for the y-component $y_2$ (or v-component $v_2$) of the second vector $V_2$ that will produce unique Holladay blocks, where h is a number of scan lines (i.e., the value of $v_1$) in the first vector $V_1$. That is, any vector with a y-component $y_a$ where ($y_a$ modulo h) is equal to ($y_2$ modulo h) will be equivalent to the vector V2. In particular, FIG. 3 shows two cases for the second vector $V_2$. The first case, which is associated with the upper vector $V_2$ in FIG. 3, uses a value of "-1" for the y-component $y_2$ (and thus the v-component $v_2$). The second case, which is shown by the lower vector $V_2$ in FIG. 3, uses a value of "-5" for the y-component $y_2$ (and thus for the v-component $v_2$).

As can clearly be seen in FIG. 3, this second case for the vector $V_2$, where the y-component $y_2=-5$, is much closer to being perpendicular to the lines defined by Eqs. (4) and (6). However, it should be appreciated this second case for the second vector $V_2$ is a redundant case, since the value of the y-component $y_1$ (and thus the v-component $v_1$) for the first vector $V_1$ is 2, and because (-5) modulo 2 is equal to (-1) modulo 2. As a result, both vectors will produce the identical Holladay blocks, as discussed below with respect to FIG. 4.

Since the base resolution R for the low resolution grid is known, and the desired frequency F has been selected, the required perpendicular distance $d_n$ for each of a number of different cycles n can be determined by simply rearranging Eq. (10) as:

$$d_n = nR/F. \quad (11)$$

where $d_n$ is a perpendicular distance for a given particular number of cycles n.

As indicated above, there are $y_1$ different possible values for the y-component $y_2$ of the second vector $V_2$. Consequently, the value for the x-component $x_2$ of the second vector $V_2$ for each different value for the perpendicular distance $d_n$ can be determined as:

$$x_2(n)_i = (d_n(m^2+1)^{0.5} + y_{2i})/m, \quad (12)$$

where:

$y_{2i}$ is the $i^{th}$ value for the y-component $y_2$ of the second vector $V_2$; and $x_2(n)_i$ is the value for the $i^{th}$ x-component $x_2$ of the second vector $V_2$ for the $n^{th}$ perpendicular distance $d_n$ and the $i^{th}$ value for the y-component $y_2$ of the second vector $V_2$.

Then, if Eq. (11) is substituted into Eq. (12) for $d_n$, $x_2(n)_i$ is:

$$x_2(n)_i=((nR/F)\cdot(m^2+1)^{0.5}+y_{2i})/m. \quad (13)$$

In general, each of the n $x_i$ values for $x_2$ determined in Eq. (13) will be a non-integer value. Moreover, none of these values for $x_2$ will necessarily be defined according to the high-addressability resolution, rather than the low resolution grid. Accordingly, the n $x_i$ high-addressability values $u_2(n)_i$ are determined by rounding the corresponding $nx_i$ values for x-component $x_2$ to the nearest integer value after multiplying the value $x_2(n)_i$ by the high-addressability factor a. That is:

$$u_2(n)_i=int(ax_2(n)_i). \quad (14)$$

In particular, the n $x_i$ values $u_2(n)_i$ represent realizable x-components $u_2$ for the second vector $V_2$ based on the high-addressability resolution. These realizable x-component values $u_2$ can then be used to determine the n $x_i$ actual, realizable frequency values f for the halftone line screen. In particular, these actual, realizable frequencies $f_i(n)$ are determined as:

$$f_i(n)=nR(m^2+1)^{0.5}/(-y_{2i}+mu_{2i}(n)/a), \quad (16)$$

where $u_{2i}(n)$ is the value of the high-addressability x-component $u_2$ for the $i^{th}$ value of the y-component $y_2$ of the second vector $V_2$ for the given value of n.

$y_2=-1$ and $n=8$ gives a value for the high-addressability x-component $u_2(8)_1$ of 243.054, requiring rounding down by 0.54. Further, inspecting Table 1 reveals that the actual frequency f for $u_2=89$ is 169.922 or an error of 0.78 from the desired frequency F of 170°. In contrast, the value for $u_2=243$ provides an actual frequency f of 170.037°, or an error of 0.37° from the desired frequency F of 170°. In general, while rounding $u_2$ of 88.958 requires less rounding than the value of $u_2$ of 243.054, the value of $u_2$ of 243.054 provides a slightly closer actual frequency to the desired frequency, due to the closeness of the rounding amounts for $n=3$ and $n=8$ to each other, relative to the higher value for n that was used to obtain the value for $u_2$ of 243.054.

In particular, in determining the actual realizable frequency f shown in Table 1, the perpendicular distance d defined in Eq. (10) is modified by replacing $x_2$ with $u_2/a$, and using the rounded values for $u_2$ set forth in Table 1. That is, the perpendicular distance $d_i(n)$ for the $i^{th}$ value of the second vector $V_2$ and the given value of n is:

$$d_i(n)=((mu_{2i}(n)/a)-y_{2i})/(m^2+1)^{0.5}. \quad (17)$$

Then, using the value of $d_i(n)$ determined in Eq. (17) and the value set forth in Table 1, the actual realizable frequencies $f_i(n)$ are:

$$f_i(n)=nR/d_i(n). \quad (18)$$

TABLE 1

| Case | n | $x_2$ −1 | $x_2$ −2 | $u_2$ −1 | $u_2$ −2 | Rounded $u_2$ −1 | Rounded $u_2$ −2 | Actual frequency −1 | Actual frequency −2 | Block −1 | Shift −1 | Block −2 | Shift −2 |
|---|---|---|---|---|---|---|---|---|---|---|---|---|---|
| 1 | 1 | 3.415 | 2.977 | 27.319 | 23.819 | 27 | 24 | 171.780 | 169.009 | 1 × 61 | 34 | 2 × 31 | 7 |
| 2 | 2 | 7.267 | 6.830 | 58.139 | 54.639 | 58 | 55 | 170.383 | 169.009 | 1 × 123 | 65 | 2 × 62 | 7 |
| 3 | 3 | 11.120 | 10.682 | 88.958 | 85.458 | 89 | 85 | 169.922 | 170.846 | 1 × 185 | 96 | 2 × 92 | 7 |
| 4 | 4 | 14.972 | 14.535 | 119.777 | 116.277 | 120 | 116 | 169.693 | 170.383 | 1 × 247 | 127 | 2 × 123 | 7 |
| 5 | 5 | 18.825 | 18.387 | 150.596 | 147.096 | 151 | 147 | 169.556 | 170.106 | 1 × 309 | 158 | 2 × 154 | 7 |
| 6 | 6 | 22.677 | 22.239 | 181.416 | 177.916 | 181 | 178 | 170.383 | 169.922 | 1 × 369 | 188 | 2 × 185 | 7 |
| 7 | 7 | 26.529 | 26.092 | 212.235 | 208.735 | 212 | 209 | 170.185 | 169.791 | 1 × 431 | 219 | 2 × 216 | 7 |
| 8 | 8 | 30.382 | 29.944 | 243.054 | 239.554 | 243 | 240 | 170.037 | 169.693 | 1 × 493 | 250 | 2 × 247 | 7 |

Table 1 shows the various values for the x-component $x_2$ and the high-addressability x-component $u_2$, the actual realizable frequency f and the block width and shift values for the resulting Holladay blocks for a halftone screen having a base resolution R of 600 scan lines per inch, and a high-addressability factor of 8, where the desired frequency F is 170 halftone lines per inch, the desired angle θ of the halftone line screen is 66.37° and the first vector $V_1$ has x-component and y-component values $x_1$ and $y_1$ of 0.875 and 2, which translates to high-addressability x-component and y-component values $u_1$ and $v_1$ of 7 and 2. It should be appreciated that, because the y-component $y_1$ of the first vector $V_1$ is 2, there are two possible unique cases or values for the y-component $y_2$ of the second vector $V_2$. In particular, in the example outlined above, the two unique values for the y-component $y_2$ are $y_{2-1}=-1$ and $y_{2-2}=-2$.

Upon inspecting Table 1, the "best" values for the high-addressability x-component $u_2$ of the second vector $V_2$ are obtained for $y_2=-1$ when $n=3$ and when $n=8$. The "best" values are those that require the least amount of rounding of the raw high-addressability x-component $u_2$ to get integer-valued high-addressability x-components $u_2$. In particular, for $y_2=-1$ and $n=3$, the high-addressability x-component $u_2(3)_1$ gives a value for the high-addressability x-component $u_2(3)_1$ of 88.958, requiring rounding up by 0.42, while, Thus, for $y_2=-1$ and $n=3$, the actual realizable frequency $f_1(3)$ is 3*600/10.5931, or 169.922°. In contrast, the actual realizable frequency $f_1(8)$ is 8*600/28.2291, or 170.037°. In particular, for the reasons outlined above, the rounding error for $u_2(8)$ is approximately equal to the rounding error for $u_2(3)_1$, but because that rounding error is spread over 8/3 as much space, the ultimate error in the actual frequency f relative to the desired frequency F for $u_2(8)_1$ is less than half that for $u_2(3)_1$.

Figure 4:
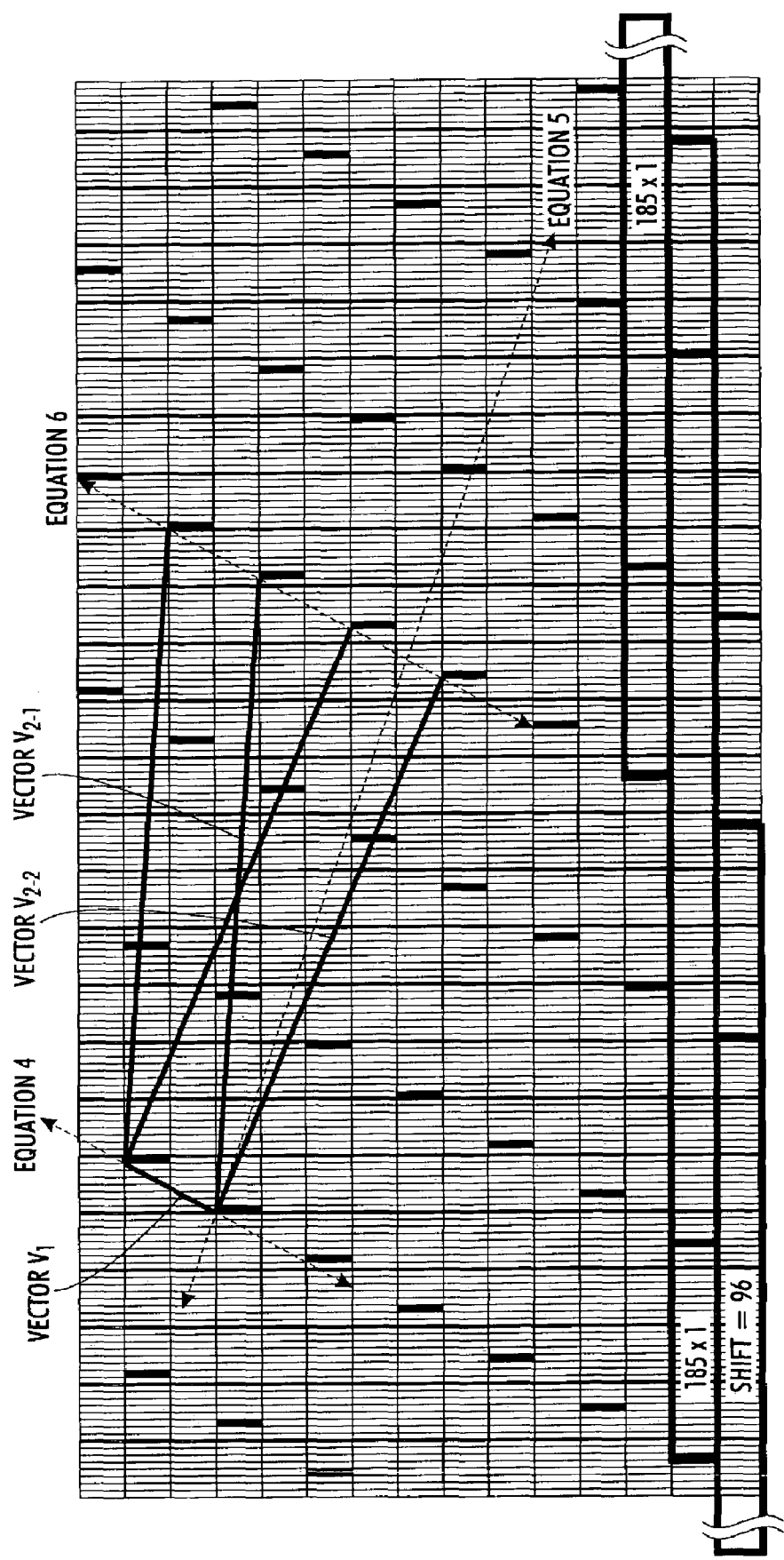
FIG. 4 shows one exemplary embodiment of a Holladay brick usable to implement the digital anamorphic line screen shown in FIG. 3.

FIG. 4 shows two redundant solutions for the second vector V and the corresponding halftone cells obtained for these two possible second vectors $V_2$ relative to the first vector $V_1$. FIG. 4 also shows the Holladay block and shift for the unique halftone cell corresponding to both vectors. That is, the Holladay block for this vector $V_2$ is 185 high-addressability units by 1 scan line with a shift of 96 high-addressability units.

Tables 2 and 3 show the results when Holladay's algorithm, as discussed in the incorporated Holladay reference, is performed using the values shown in Table 1 for $V_2=-1$ and $n=3$ and $n=8$, respectively.

TABLE 2

| z | w | p | q | A | L | K | t | D | S |
|---|---|---|---|---|---|---|---|---|---|
| 7 | 89 | — | 1 | 185 | 185 | 185 | 1 | 96 | 89 |
| -2 | 1 | 1 | — | | | | | | |

TABLE 3

| z | w | p | q | A | L | K | t | D | S |
|---|---|---|---|---|---|---|---|---|---|
| 7 | 243 | — | 1 | 493 | 493 | 493 | 1 | 250 | 243 |
| -2 | 1 | 1 | — | | | | | | |

It should be appreciated that, in the incorporated Holladay reference, the disclosed algorithm includes the parameters "D" and "S", which represent the shift parameter for either Left or Right shifts, respectively. However, in different implementations, these D and S shift parameters are sometimes reversed to represent the Right and Left shifts, respectively.

As shown in Tables 2 and 3, the Holladay brick formed with $y_2=-1$ and $n=8$ provides an actual frequency f that is slightly closer to the desired frequency F than that provided by the Holladay brick formed when $y_2=-1$ and $n=3$. However, this resulting Holladay brick is extremely unwieldy. This is due to its extreme length and thinness. Thus, the Holladay brick provided when $y_2=-1$ and $n=3$ provides a superior solution.

Figure 5:
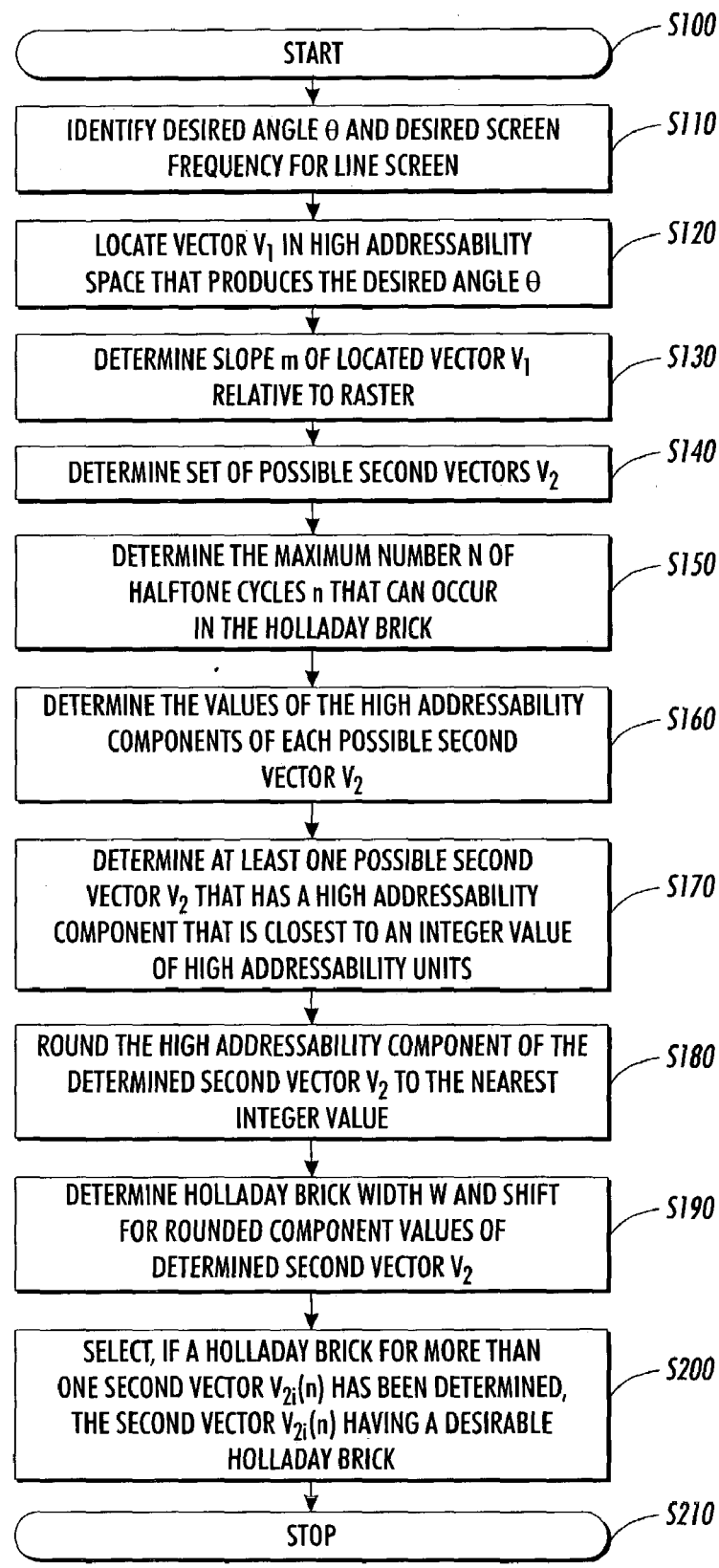
FIG. 5 is a flowchart outlining a first exemplary embodiment of a method for designing a digital anamorphic line screen according to this invention.

FIG. 5 is a flowchart outlining one exemplary embodiment of a method for determining a Holladay brick for an anamorphic halftone line screen formed using a high-addressability grid. As shown in FIG. 5, beginning in step S100, operation continues to step S110, where a desired screen angle θ and a desired screen frequency F of the halftone line screen are input. Next, in step S120, a first vector $V_1$ is located using the high-addressability grid to produce the desired angle θ. Then, in step S130, the slope m of the located first vector $V_1$ relative to the high-addressability raster grid is determined. Operation then continues to step S140.

In step S140, the set of possible y-components $y_{2i}$ of the second vector $V_2$ is determined. In particular, as outlined above, the number of possible y-components $y_{2i}$ is determined by the value of the y-component $y_1$ of the first vector $V_1$. Then, in step S150, a maximum number N of halftone cycles n that can, or are allowed to, occur in the Holladay brick to be formed is determined or selected. Next, in step S160, for each different number of halftone cycles n that can or that are allowed to occur in the Holladay brick, and for each different y-component $y_{2i}$ of the second vector $V_2$, a value for the high-addressability component $ax_{2i}(n)_1$ or $u_{2i}(n)$ is determined. Operation then continues to step S170.

In step S170, at least one of the possible second vectors $V_{2i}(n)$ that has a high-addressability component $u_{2i}(n)$ that is close to an integer value of high-addressability units is determined or located. Next, in step S180, each of the high-addressability components $u_{2i}(n)$ determined or located in step S170 is rounded to the nearest integer value. Then, in step S190, the Holladay brick with W and offset D for the rounded high-addressability component $u_{2i}(n)$ is determined for each of the determined or located second vectors $V_{2i}(n)$. Operation then continues to step S200.

In step S200, if more than one second vector $V_{2i}(n)$ was determined or located in step S170, one of the corresponding Holladay bricks for the different determined or located second vectors $V_{2i}(n)$ is selected as the desired Holladay brick for the desired angle θ and the desired screen frequency F for the halftone line screen. Of course, if only one second vector $V_2$ was selected in step S170, the Holladay brick corresponding to that determined or located second vector $V_2$ is selected automatically. Operation then continues to step S210, where operation of the method ends. It should be appreciated that the above-outlined method steps can be implemented as program instructions of a suitably programmed general-purpose processing device, such as a general-purpose computer, a digital signal processor, or the like, can be implemented as a hardware circuit, such as an ASIC or the like, or can be performed by hand.

Figure 6:
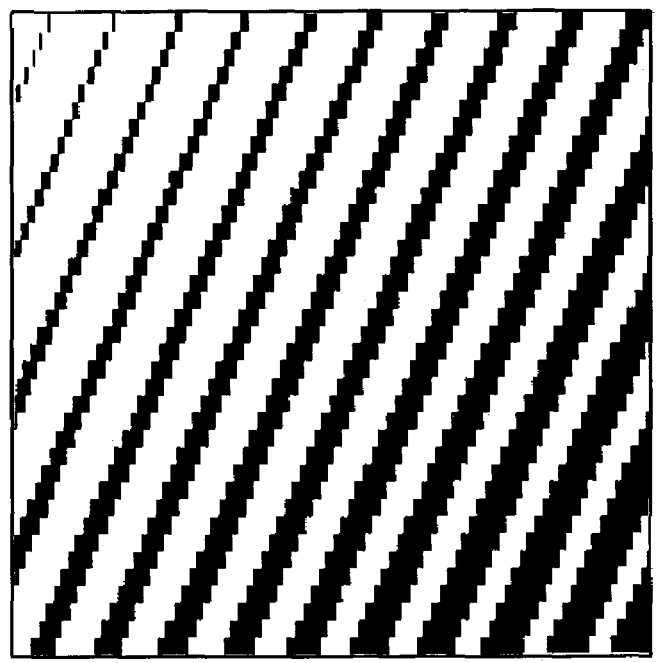
FIGS. 6 and 7 illustrate exemplary digital anamorphic line screens designed according to this invention.
Figure 7:
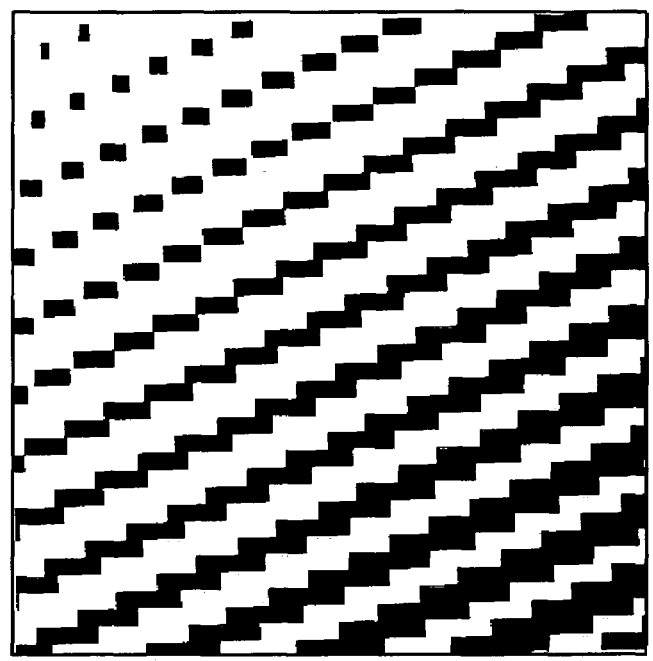

FIGS. 6 and 7 show two different examples of anamorphic line screens designed according to this invention.

While particular embodiments have been described, alternatives, modifications, variations, improvements, and substantial equivalents, whether known or that are or may be presently unforeseen, may become apparent to applicants or others skilled in the art. Accordingly, the exemplary embodiments of the invention, as set forth above, are intended to be illustrative, not limiting. Various changes may be made without departing from the spirit and scope of the invention. Therefore, the appended claims as filed and as they may be amended are intended to embrace all known or later-developed alternatives, modifications variations, improvements, and substantial equivalents.

What is claimed is:

1. A method for creating an anamorphic halftone line screen based on a desired screen angle and a desired screen frequency using a high-addressability grid having a high-addressability direction and a low addressability direction, comprising:

defining a first vector on the high-addressability grid having the desired screen angle;

determining a low-addressability-direction component for at least one possible second vector;

determining, for each of at least one number of cycles of the halftone line screen, for each low-addressability-direction component of the at least one second vector, a high-addressability-direction component for the second vector for that number of cycles and for that low-addressability-direction component;

selecting at least one of the determined high-addressability-direction components that is close to an integer number of high-addressability units of the high-addressability grid;

rounding at least one of the at least one selected high-addressability-direction components that is close to an integer number of high-addressability units to a nearest integer value to define a second vector having that rounded high-addressability-direction component and the low-addressability-direction component that was used to determine the corresponding determined high-addressability-direction component;

determining, for at least one defined second vector, a size and a shift of a Holladay brick usable to represent a halftone line screen cell defined by the first vector and that second vector, wherein the anamorphic halftone line screen is defined by the determined Holladay brick.

2. The method of claim 1, further comprising identifying a maximum number of cycles of the halftone line screen, wherein determining, for each of at least one number of cycles of the halftone line screen, for each low-addressability-direction component of the at least one second vector, a high-addressability-direction component for that number of cycles and for that low-addressability-direction component comprises determining, for each of the number of cycles of the halftone line screen up to the identified maximum number of cycles, for each low-addressability-direction component of the at least one second vector, a high-addressability-direction component for that number of cycles and for that low-addressability-direction component.

3. The method of claim 2, wherein identifying a maximum number of cycles of the halftone line screen comprises selecting the maximum number of cycles.

4. The method of claim 3, wherein selecting the maximum number of cycles comprises inputting the maximum number of cycles.

5. The method of claim 2, wherein identifying a maximum number of cycles of the halftone line screen comprises automatically determining the maximum number of cycles.

6. The method of claim 1, further comprising inputting the desired screen angle.

7. The method of claim 6, further comprising inputting the desired screen frequency.

8. The method of claim 6, further comprising automatically determining the desired screen frequency.

9. The method of claim 1, further comprising automatically determining the desired screen angle.

10. The method of claim 9, further comprising inputting the desired screen frequency.

11. The method of claim 9, further comprising automatically determining the desired screen frequency.

12. The method of claim 1, wherein determining the low-addressability-direction component for at least one possible second vector comprises determining the low-addressability-direction component for h possible second vectors, where h is equal to the value of the low-addressability-direction component of the first vector.

13. The method of claim 1, further comprising determining a slope of the first vector relative to the high-addressability grid, wherein determining the high-addressability-direction component for a given number of cycles and for a given low-addressability-direction component comprises determining the high-addressability-direction component for a given number of cycles and for a given low-addressability-direction component based on the determined slope.

14. A computer readable medium storing a set of program instructions executable on a data processing device and usable to create an anamorphic halftone line screen based on a desired screen angle and a desired screen frequency using a high-addressability grid having a high-addressability direction and a low addressability direction, the set of program instructions comprising:
  instructions for defining a first vector on the high-addressability grid having the desired screen angle;
  instructions for determining a low-addressability-direction component for at least one possible second vector;
  instructions for determining, for each of at least one number of cycles of the halftone line screen, for each low-addressability-direction component of the at least one second vector, a high-addressability-direction component for the second vector for that number of cycles and for that low-addressability-direction component;
  instructions for selecting at least one of the determined high-addressability-direction components that is close to an integer number of high-addressability units of the high-addressability grid;
  instructions for rounding at least one of the at least one selected high-addressability-direction components that is close to an integer number of high-addressability units to a nearest integer value to define a second vector having that rounded high-addressability-direction component and the low-addressability-direction component that was used to determine the corresponding determined high-addressability-direction component;
  instructions for determining, for at least one defined second vector, a size and a shift of a Holladay brick usable to represent a halftone line screen cell defined by the first vector and that second vector, wherein the anamorphic halftone line screen is defined by the determined Holladay brick.

15. The method of claim 14, further comprising instructions for identifying a maximum number of cycles of the halftone line screen, wherein the instructions for determining, for each of at least one number of cycles of the halftone line screen, for each low-addressability-direction component of the at least one second vector, a high-addressability-direction component for that number of cycles and for that low-addressability-direction component comprise instructions for determining, for each of the number of cycles of the halftone line screen up to the identified maximum number of cycles, for each low-addressability-direction component of the at least one second vector, a high-addressability-direction component for that number of cycles and for that low-addressability-direction component.

16. The method of claim 15, wherein the instructions for identifying a maximum number of cycles of the halftone line screen comprise instructions for selecting the maximum number of cycles.

17. The method of claim 16, wherein the instructions for selecting the maximum number of cycles comprise instructions for inputting the maximum number of cycles.

18. The method of claim 16, wherein the instructions for identifying a maximum number of cycles of the halftone line screen comprise instructions for automatically determining the maximum number of cycles.

19. The method of claim 13, further comprising instructions for inputting the desired screen angle.

20. The method of claim 19, further comprising instructions for inputting the desired screen frequency.

21. The method of claim 19, further comprising instructions for automatically determining the desired screen frequency.

22. The method of claim 13, further comprising instructions for automatically determining the desired screen angle.

23. The method of claim 22, further comprising instructions for inputting the desired screen frequency.

24. The method of claim 22, further comprising instructions for automatically determining the desired screen frequency.

25. The method of claim 14, wherein the instructions for determining the low-addressability-direction component for at least one possible second vector comprise instructions for determining the low-addressability-direction component for h possible second vectors, where h is equal to the value of the low-addressability-direction component of the first vector.

26. The method of claim 14, further comprising instructions for determining a slope of the first vector relative to the high-addressability grid, wherein the instructions for determining the high-addressability-direction component for a given number of cycles and for a given low-addressability-direction component comprise instructions for determining the high-addressability-direction component for a given number of cycles and for a given low-addressability-direction component based on the determined slope.

* * * * *